(12) United States Patent
Otsuki et al.

(10) Patent No.: US 6,185,035 B1
(45) Date of Patent: *Feb. 6, 2001

(54) OPTICAL MICROSCOPE

(75) Inventors: Shinya Otsuki; Takeo Tanaami, both of Tokyo (JP)

(73) Assignee: Yokogawa Electric Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/257,154

(22) Filed: Feb. 24, 1999

(30) Foreign Application Priority Data

Mar. 19, 1998 (JP) .................................... 10-069649

(51) Int. Cl.[7] ................................................. G02B 21/00
(52) U.S. Cl. ......................... 359/368; 359/234; 359/386
(58) Field of Search ..................... 359/234, 235, 359/368, 370, 371, 385, 386, 389, 723

(56) References Cited

U.S. PATENT DOCUMENTS

| | | | | |
|---|---|---|---|---|
| 5,032,720 | * | 7/1991 | White ................................... | 250/236 |
| 5,035,476 | * | 7/1991 | Ellis et al. ........................... | 359/202 |
| 5,067,805 | * | 11/1991 | Corle et al. ........................... | 359/235 |
| 5,162,941 | * | 11/1992 | Favro et al. ........................... | 359/386 |
| 5,303,082 | * | 4/1994 | Obuchi et al. ....................... | 359/371 |
| 5,428,475 | * | 6/1995 | Tanaami et al. ..................... | 359/368 |

* cited by examiner

*Primary Examiner*—Cassandra Spyrou
*Assistant Examiner*—Mark A. Robinson
(74) *Attorney, Agent, or Firm*—Moonray Kojima

(57) ABSTRACT

An optical microscope that can observe the image of a sample by scanning the sample, wherein are provided a beam splitter to branch a linearly polarized incident light beam and a light beam reflected from the sample; an objective lens to illuminate the sample by focusing the incident light beam on the sample; and a quarter wavelength plate disposed between the objective lens and sample, whereby the placement of the quarter wavelength plate on the sample side of the objective lens improves the S/N ratio and allows low reflectivity samples to be measured.

4 Claims, 3 Drawing Sheets

FIG. 1 [PRIOR ART]

OPTICAL MICROSCOPE

BACKGROUND OF THE INVENTION

1. Field of Invention

This invention relates to an optical microscope; and more particularly, to an improvement thereof which results in reduced background light and achieves high S/N ratio in scanning type or reflecting type confocal optical microscopes.

2. Description of the Prior Art

Scanning reflecting type confocal optical microscopes are well known. FIG. 1 shows an example of a conventional confocal optical microscope, wherein light beam emitted from a suitable light source 1, such as a mercury arc lamp or laser, is polarized with a polarizer 2 into a linearly polarized light beam. The polarized light beam is transmitted through beam splitter 3 and is made incident to pinhole array disk 4, such as a Nipkow disk.

The light beam that is transmitted through pinhole array disk 4 is polarized into a circularly polarized light beam by a quarter wavelength plate 6 (also abbreviated $\lambda/4$ plate). The circularly polarized light beam is focused by objective lens 7 and irradiated on sample 8. In this case, a plurality of spots irradiated on sample 8 is sequentially scanned with the light beam polarized circularly by rotating pinhole array disk 4 by driving the disk 4 with motor 5.

The light beam reflected by sample 8 is focused by objective lens 7 and is linearly polarized by passing through the quarter wavelength plate 6, and forms an image on the same pinhole array disk 4. The light beam that is passed through the pinholes of disk 4 is made incident to beam splitter 3, reflected in the perpendicular direction, is made incident to analyzer 9, and forms an image on camera 11 via relay lens 10 after being polarized linearly. The image of sample 8 captured with camera 11 is displayed on the screen of monitor 12.

In the conventional prior art system, background light caused by pinhole array disk 4 can be reduced about $10^{-4}$ in light intensity by use of a pair of polarizers 2 and analyzer 9 and quarter wavelength plate 6. However, there is still the following problem. Quarter wavelength plate 6 is arranged between objective lens 7 and pinhole array disk 4 in order to shield the light beam incident on sample 8 from the light beam reflected from sample 8. In this system, the reflected light beam caused by pinhole array disk 4 can be cut off by analyzer 9. However, the light beam reflected from the surface of objective lens 7, after the incident light beam passes through quarter wavelength plate 6, cannot be cut off by analyzer 9 because objective lens 7, located under quarter wavelength plate 6, is handled in the same manner as sample 8 during polarization process.

Accordingly, a reflection preventing coat is applied on the surface of objective lens 7. But, the objective lens 7 has a reflectivity ranging from 0.5 to several percent. Such reflection scarcely causes the above problem if an object whose surface reflectivity is high, such as a metallic surface, is to be measured. However, if a sample is to be measured whose surface reflectivity is low, such as the inside of multiple layers, skin, or the inside of a living body, for example having a reflectivity lower than 0.1%, such reflection as background light significantly hinders observation and measurement. A similar problem exits even if a sample has a high surface reflectivity if it is greatly inclined, because the signal becomes very weak.

SUMMARY OF THE INVENTION

Accordingly, an object of the invention is to overcome the aforementioned and other deficiencies, disadvantages, and problems of the prior art.

Another object is to realize an optical microscope that has less background light and a high S/N ratio.

The foregoing and other objects, advantages and features are attained by the invention which encompasses an optical microscope that can observe the image of a sample by scanning the sample with light, and comprising a beam splitter branching a linearly polarized light beam and a light beam reflected from the sample; an objective lens for illuminating the sample by focusing the incident light beam on the sample; and a quarter wavelength plate disposed between the objective lens and the sample; wherein the S/N ratio of the microscope is improved and samples of low reflectivity can be readily measured by locating the quarter wavelength plate under the objective lens, that is on the sample side.

DETAILED DESCRIPTION OF THE PREFERRED EMBODIMENTS

Figure 1:
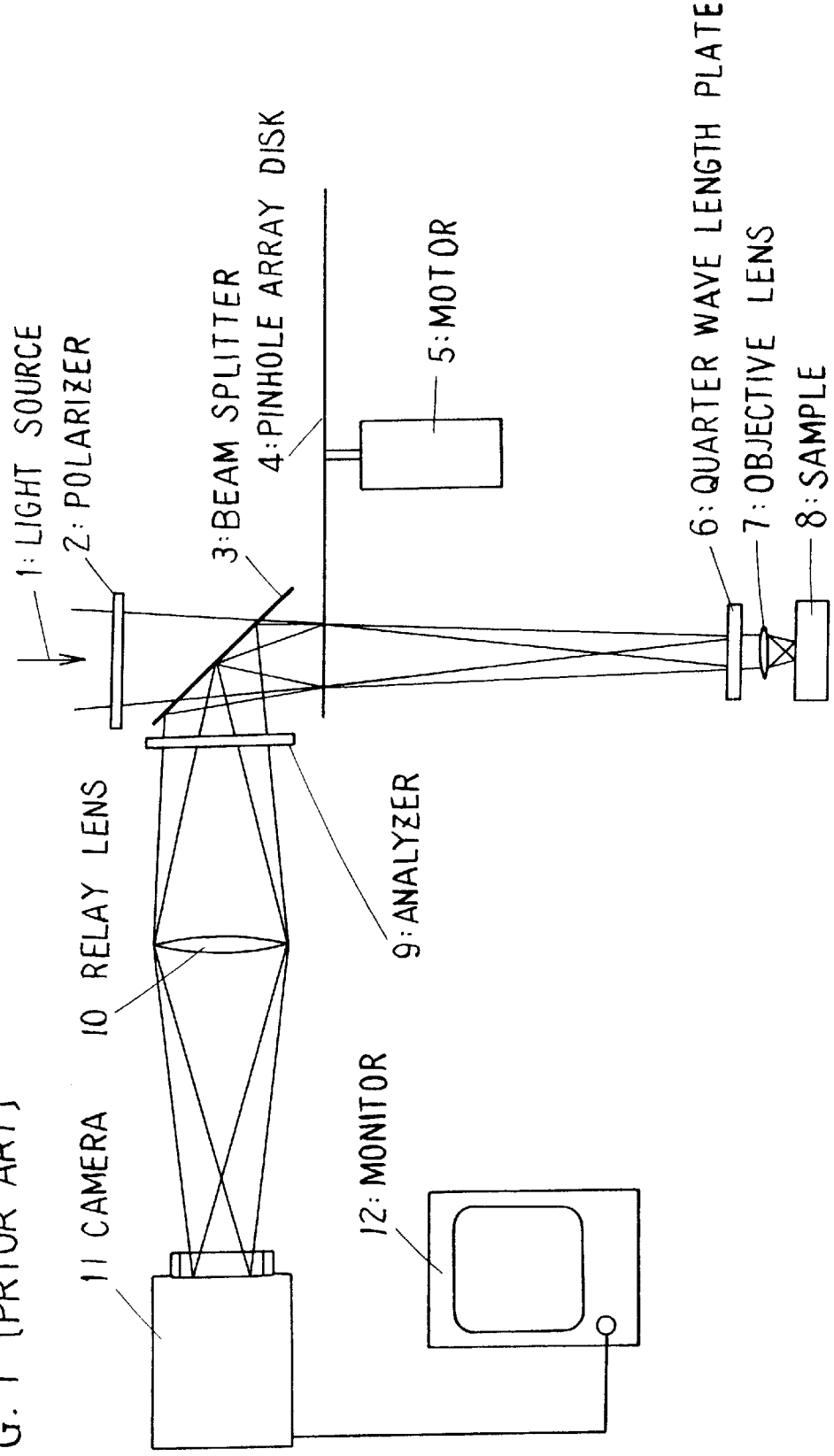
FIG. 1 is a drawing depicting a conventional optical microscope.
Figure 2:
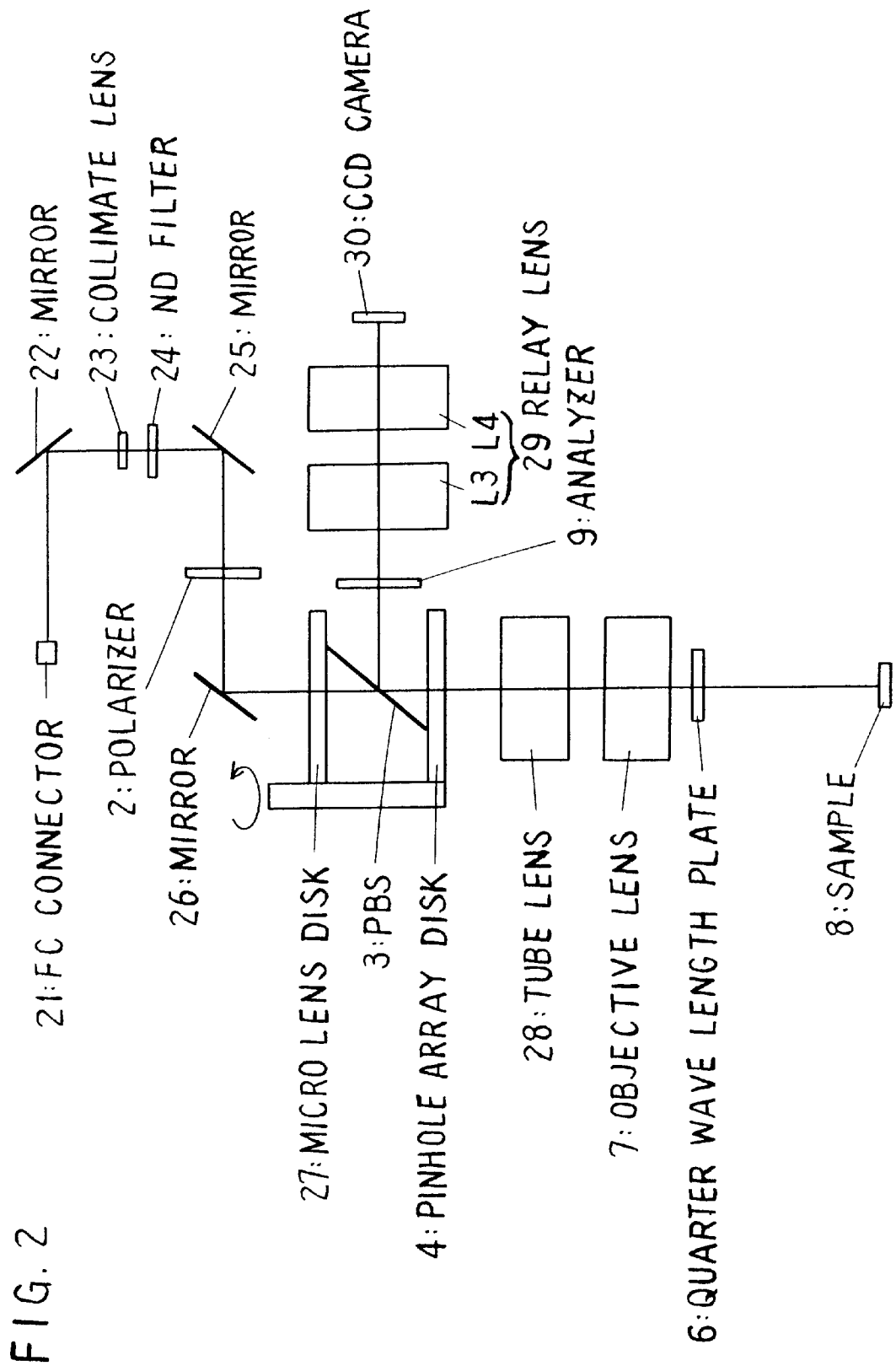
FIG. 2 is a drawing depicting an illustrative embodiment of the invention.

In FIG. 2, the same symbols used for the same parts in the system of FIG. 1 are used in the remaining figures and will not be further discussed hereat for sake of clarity of description. Mirrors 22, 25 and 26 are provided to change the direction of a light beam. A laser light beam is introduced into mirror 22 via FC connector 21. The laser light beam is introduced into FC connector 21 through an optical fiber, not shown, from a laser source, not shown. An arc light source or a lamp may be used in place of the laser as a light source. In addition, a light source may be located directly in place of the FC connector and not be limited to the light source introduction method using an optical fiber connected to the FC connector.

Collimating lens 23 is a lens for changing the reflected light from mirror 22 into parallel light beam. ND filter 24 is a beam attenuating filter used for suitably controlling the quantity of light to be irradiated on sample 8. Collimating lens 23 and ND filter 24 are arranged between mirrors 22 and 25. In addition, polarizer 2 is located between mirrors 25 and 26.

Micro lens disk 27 (in FIG. 2, the left half of the micro lens arrangement is omitted for clarity of description) is mounted above and in parallel with a pinhole array disk 4 in a manner as though polarized beam splitter 3 were sandwiched by microlens disk 27 and pinhole array disk 4. Pinhole array disk 4 is a disk in which a plurality of very small apertures are located in a predetermined pattern (This type of disk is called a Nipkow disk). Micro lenses arranged in the same pattern as that of the pinholes in the pinhole array disk 4 are mounted on micro lens disk 27. The micro lens has the effect of enhancing the light utilization factor. Approximately 20,000 micolenses and pinholes are arranged in micro lens disk 27 and pinhole array disk 4, respectively, and forming helical patterns. Laser light beam from mirror 26 illuminates an area, for example, of 10 mm by 7 mm on pinhole array disk 4. The two disks 27 and 4 are constructed to be concurrently rotated by a motor, not shown.

Tube lens 28, objective lens 7 and quarter wavelength plate 6 are arranged between pinhole array disk 4 and sample 8. The micro-scope is designed so that the return light beam from sample 8, that is reflected by beam splitter 3, is made incident to CCD (Charge Coupled Device) camera 30 through relay lenses 29.

The embodiment operates as follows. The laser light beam, introduced through FC connector 21, is made incident to collimating lens 23, after changing its direction with mirror 22, where the beam is converted to a parallel beam, and then is made incident to ND filter 24, which reduces the light intensity thereof. After the light intensity has been reduced through ND filter 24, the direction of the beam is changed by mirror 25, and the beam is made incident to polarizer 2.

The laser light beam is converted to a linearly polarized light beam by being passed through polarizer 2. The light beam in polarized state, after having its direction of travel changed by mirror 26, is focused with micro lenses in micro lens disk 27 and irradiates each. pinhole in pinhole array disk 4 corresponding to each micro lens after being transmitted through beam splitter 3.

In this case, a light beam reflected from the surface of pin-hole array disk 4 reaches analyzer 9 after being reflected by beam splitter 3. However, since the azimuthal angles of polarizer 2 and analyzer 9 are adjusted to attain the extinguished state, the light beam reflected from pinhole array disk 4 is cut off by analyzer 9 and does not reach CCD camera 30, the extinction ratio being in the order of about $10^{-6}$.

The light beam that has been transmitted through the pinholes is focused on sample 8 by tube lens 28 and objective lens 7. Tube lens 28 and objective lens 7 are constructed with a plurality of lenses and each lens causes a slight reflected light on its surfaces especially in the vicinity of the optical axis. The reflected light beams reach analyzer 9 after passing through pinhole array disk 4 again and are reflected by polarized beam splitter 3. However, the reflected light beams do not reach CCD camera 30 since they are cut off by analyzer 9 for the same reason as for the pinhole array disk 4. The reflected light beams act as background light against the observation light, or as noise light.

The light beam that is focused on objective lens 7 is circularly polarized by the quarter wavelength plate 6, which is disposed between objective lens 7 and sample 8. Circularly polarized spots are irradiated on sample 8 as approximately 1,000 very small spots. The spots scan the surface of sample 8 forming a raster, each constituting a scanning line by rotation of the micro lens disk 27 and the pinhole array disk 4.

The light beam focused on sample 8 is reflected by sample 8 and becomes a linearly polarized light beam again by being transmitted through the quarter wavelength plate 6. However, since a onehalf phase delay is generated, the light beam becomes a linearly polarized light beam whose azimuthal angle is inclined by 90°. Then, the light beam is focused by tube lens 28 and forms an angle on pinhole array disk 4.

The light beam that passes through the pinholes is reflected by polarized beam splitter 3, then is made incident on analyzer 9, and then directly forms an image on CCD camera 30 through relay lens 29.

Furthermore, observation of the image may be done by means other than the CCD camera 30. For example, a CMOS image pickup camera or a photographing camera with film may be used. Also, the image can be directly observed through an eyepiece by the naked eye.

The invention has the following advantageous features. Polarizer 2 and analyzer 9 are arranged for the extinguished state. The quarter wavelength plate 6 is placed at the azimuthal angle of 45° to the azimuth of the light beam irradiated from objective lens 7, and is disposed between objective lens 7 and sample 8.

The embodiment reduces "stray light" including reflected light generated by optical components located between the polarizer 2 and the quarter wavelength plate 6, and between quarter wavelength plate 6 and analyzer 9, by an extinction ratio of the order of $10^{-4}$ in light intensity. Thus, the embodiment transmits light beam that is transmitted through plate 6, that is to say, the reflected light from sample 8 is 100% transmitted as an observation light. This allows the image of the sample 8 to be observed clearly.

In conventional microscopes, such as shown in FIG. 1, since plate 6 is located between pinhole array disk 4 and objective lens 7, the surface reflected light from objective lens 7 cannot be reduced in that polarization system.

On the other hand, in the invention, advantageously, background light due to the objective lens 7, when observing a low reflectivity sample, can be drastically reduced by placing the quarter wavelength plate 6 between objective lens 7 and sample 8.

The following results were obtained in experiments conducted with the embodiment. The quantity of light that reaches the CCD camera 30 was compared for the cases where an optical mirror was placed and was not placed in the position of the sample for each of the cases of the conventional microscope and the embodiment of the invention. However, the optical mirror was used in place of sample 8 had a reflectivity of 36%.

| | |
|---|---:|
| Conventional Microscope | 24.0 µW |
| Invention Microscope | 21.0 µW |
| CASE(2) Where nothing is placed in the position of the sample. | |
| Conventional Microscope | 3.0 µW |
| Invention Microscope | 0.090 µW |

In the case (2) where nothing was placed in the position of the sample, that is the case where the reflectivity is 0%, the light intensity was 3.0 µW for the conventional microscope, and 0.090 µW for the invention microscope. This is equivalent to the background light or "noise light" generated inside the optical microscope. The level of the noise light is fixed and the ratio of the above signal light to the noise light is the S/N ratio of the image obtained by the CCD camera.

According to the above experimental results, the S/N ratio of the conventional microscope is 9.0 dB and that of the invention microscope is 23.6 dB. Assume that transparent glass having the reflectivity of one order smaller (i.e. reflectivity of 3.6%) than the mirror having the reflectivity of 36% is used for the sample. Observation cannot be done with a conventional microscope but can be done with the invention microscope, with a margin of one order of S/N ratio.

The invention is not restricted to the foregoing embodiment. For example, although optical scanning is done by rotating a Nipkow disk in the above embodiment, scanning can be done by use of an ordinary mirror or by use of an acoustic optic element (AOM means Acoustic Optic Modulator).

Figure 3:
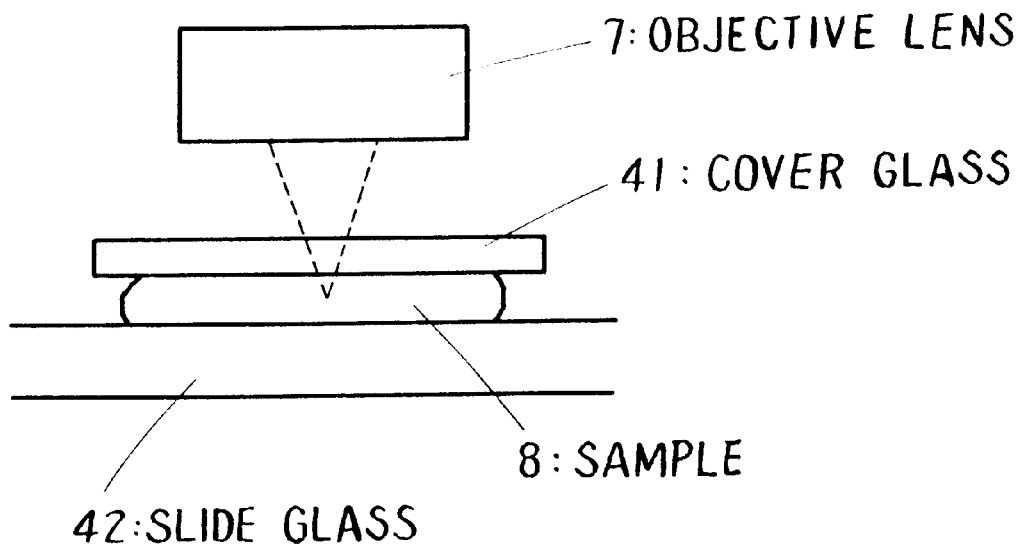
FIG. 3 is a drawing depicting use of a cover glass as the quarter wavelength plate.
Figure 4:
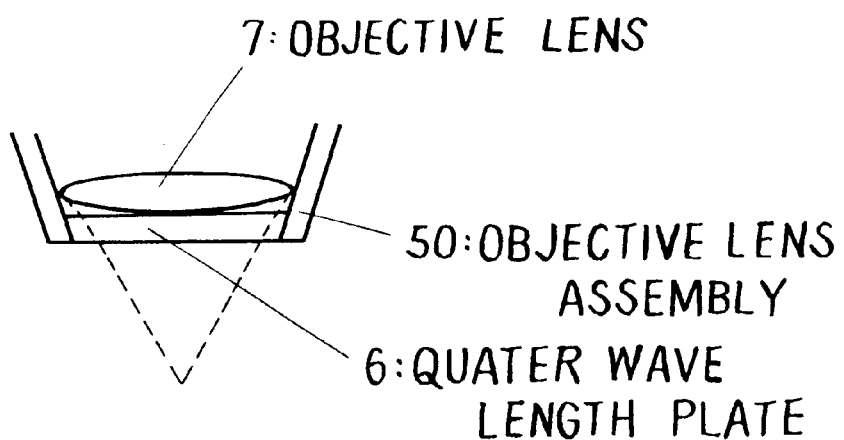
FIG. 4 is a drawing depicting a quarter wavelength plate incorporated in an objective lens.

The placement of the quarter wavelength plate 6 is easy to accomplish if a sufficient gap , i.e. working distance, is provided between the objective lens 7 and sample 8. However, in the case where high magnification is desired or the system is immersed in oil, placement of the quarter wavelength plate 6 is difficult because the working distance or gap is usually small. In such a case, an alternative arrangement, such as shown in FIG. 3, would be to use a cover glass 41 placed on the surface of sample 8, mounted on slide glass 42, as the quarter wavelength plate. Another alternative arrangement, as shown in FIG. 4, is to incorporate the quarter wavelength plate in an objective lens assembly 50, and substitute the combination for the objective lens 7. Also, two polarizers and a half mirror may be used in place of a polarized beam splitter 3.

The invention has the following and other advanageous effects. For example, the S/N ratio is greatly improved and samples having low reflectivity can be measured by placing the quarter wavelength plate under the objective lens, that is on the sample side. Moreover, samples having low reflectivity can be measured by the invention with high S/N ratio even in an optical microscope using a confocal optical scanner that rotates a substrate having very small apertures. Furthermore, samples having low reflectivity can also be measured by the invention at a high S/N ratio even in an optical microscope using a confocal optical scanner that performs optical scanning using a movable mirror or an acoustic optical modulator. Also, a polarized beam splitter or two polarizaers and a half mirror can be used as the beam spitter in the invention and obtain the advantage of increased flexibity of component selection. Furthermore, even if the distance between the objective lens and the sample is small, the quarter wavelength plate can be easily arranged in the invention between the objective lens and the sample. Also, advantageously, a Nipkow disk can be used in the invention as a substrate having a plurality of very small apertures. Finally and advantageously, in the invention, a light beam can be focused on each pinhole of the Nipkow disk for irradiation through micro lenses of a micro lens disk by mounting the micro lens disk in parallel with the Nipkow disk, which enhances the light utilization factor.

The foregoing description is illustrative of the principles of the invention. Numerous modifications and extensions thereof would be apparent to the worker skilled in the art. All such modifications and extensions are to be construed to be within the spirit and scope of the invention.

What is claimed is:

1. In a confocal optical microscope for observing an image of a sample by optically scanning said sample, said microscope comprising:

a light source for providing an incident light;

polarizer means for polarizing said incident light;

rotatable disk means comprising:
    a microlens disk having a plurality of microlenses arranged in a first pattern;

a Nipkow disk having a plurality of pin holes arranged in a second pattern, said second pattern being similar to said first pattern; and means for connecting said microlens disk to be parallel to and at a predetermined distance from said Nipkow disk and to be concurrently rotatable;

a beam splitter disposed between said microlens disk and said Nipkow disk for branching incident light from said light source through said microlens to said pin holes and to an objective lens to said sample, and for branching reflected light from said sample through said pin holes to an output terminal;

analyzer means for analyzing reflected light from said sample which is outputted from said beam splitter; and said objective lens used to illuminate said sample by focusing said polarized light onto said sample; the improvement wherein disposed between said objective lens and said sample is a quarter wavelength plate only which is positioned at an azimuthal angle of 45°, and wherein said polarizer means and said analyzer means are adjusted to azimuthal angles which produce an extinguished state for reflected light from components of said microscope other than reflected light from said sample of about $10^{-6}$ and ratio of surface reflection at said objective lens of $10^4$ or less, so that signal to noise ratio is improved with reflected light from said sample being 100% transmitted and background light including light reflected from said objective lens and other components of said microscope other than said sample being reduced so that measurement of a sample of low reflectivity is made possible.

2. The microscope of claim 1, wherein said beam splitter comprises a polarized beam splitter or two polarizers and a half mirror.

3. The microscope of claim 1, wherein said quarter wavelength plate is incorporated into said objective lens.

4. The microscope of claim 1, wherein said quarter wavelength plate is used as a cover glass mounted on said sample.

\* \* \* \* \*